US012735441B2

(12) United States Patent
Yvon-Bessette et al.

(10) Patent No.: US 12,735,441 B2
(45) **Date of Patent: *Sep. 15, 2026**

(54) PREPARATION OF MULTIFUNCTIONAL ORGANOSILICON COMPOUNDS

(71) Applicants: DOW SILICONES CORPORATION, Midland, MI (US); DOW GLOBAL TECHNOLOGIES LLC, Midland, MI (US)

(72) Inventors: André Yvon-Bessette, Midland, MI (US); John Roberts, Midland, MI (US); Nanguo Liu, Midland, MI (US); Xiaoyuan Zhou, Midland, MI (US); Eric Joffre, Midland, MI (US)

(73) Assignees: DOW SILICONE CORPORATION, Midland, MI (US); DOW GLOBAL TECHNOLOGIES LLC, Midland, MI (US)

(*) Notice: Subject to any disclaimer, the term of this patent is extended or adjusted under 35 U.S.C. 154(b) by 755 days.

This patent is subject to a terminal disclaimer.

(21) Appl. No.: 18/013,877

(22) PCT Filed: Jun. 30, 2021

(86) PCT No.: PCT/US2021/039773

§ 371 (c)(1),
(2) Date: Dec. 29, 2022

(87) PCT Pub. No.: WO2022/006207

PCT Pub. Date: Jan. 6, 2022

(65) Prior Publication Data

US 2023/0295193 A1 Sep. 21, 2023

Related U.S. Application Data

(60) Provisional application No. 63/046,591, filed on Jun. 30, 2020.

(51) Int. Cl.
*C07F 7/18* (2006.01)
*C07F 7/08* (2006.01)

(52) U.S. Cl.
CPC .......... *C07F 7/0896* (2013.01); *C07F 7/1804* (2013.01); *C07F 7/188* (2013.01)

(58) Field of Classification Search
CPC ............................... C07F 7/1804; C07F 7/188
See application file for complete search history.

(56) References Cited

U.S. PATENT DOCUMENTS

| | | | | |
|---|---|---|---|---|
| 3,294,737 | A | 12/1966 | Krantz | |
| 3,426,386 | A | 2/1969 | Wise | |
| 4,058,546 | A | 11/1977 | Knollmueller | |
| 4,504,629 | A | 3/1985 | Lien et al. | |
| 4,742,177 | A | 5/1988 | Yamamoto et al. | |
| 5,457,220 | A | 10/1995 | Razzano | |
| 5,484,950 | A | 1/1996 | Crivello | |
| 5,686,641 | A | 11/1997 | Okawa | |
| 6,013,753 | A | 1/2000 | Krahnke et al. | |
| 6,337,382 | B1 | 1/2002 | Igarashi et al. | |
| 8,076,411 | B2 | 12/2011 | Maton et al. | |
| 8,580,862 | B2 | 11/2013 | Barnes | |
| 9,051,428 | B2 | 6/2015 | Davio | |
| 9,475,968 | B2 | 10/2016 | Hammond et al. | |
| 12,378,264 | B2 * | 8/2025 | Eldred | C08G 77/12 |
| 2002/0099232 | A1 | 7/2002 | Ozai et al. | |
| 2012/0022210 | A1 | 1/2012 | Davio et al. | |
| 2012/0053290 | A1 | 3/2012 | Barnes et al. | |
| 2016/0122458 | A1 | 5/2016 | Cakmak et al. | |

FOREIGN PATENT DOCUMENTS

| | | | | |
|---|---|---|---|---|
| CN | 106279233 | A | 1/2017 | |
| DE | 60007583 | T2 | 11/2004 | |
| EP | 0733637 | A1 | 9/1996 | |
| EP | 1013653 | A2 * | 6/2000 | C07F 7/02 |
| EP | 1085022 | A1 | 3/2001 | |
| EP | 1201672 | A2 * | 5/2002 | C07F 7/1804 |
| EP | 1867652 | A1 | 12/2007 | |
| JP | H07173178 | A | 7/1995 | |
| JP | H1180315 | | 3/1999 | |
| JP | H11158232 | | 6/1999 | |
| JP | 2000256374 | A | 9/2000 | |
| JP | 2008070761 | A | 3/2008 | |
| JP | 2012121950 | A | 6/2012 | |
| JP | 2013185066 | A | 9/2013 | |
| JP | 2018184395 | A | 11/2018 | |
| RU | 2277106 | C1 | 5/2006 | |
| WO | 2008088523 | | 7/2008 | |
| WO | 2014033442 | A1 | 3/2014 | |
| WO | 2018004797 | | 1/2018 | |
| WO | 2019005713 | A1 | 1/2019 | |
| WO | 2019005788 | A1 | 1/2019 | |
| WO | 2020142443 | A1 | 7/2020 | |

OTHER PUBLICATIONS

PubChem for acetate (Year: 2004).*
J. March, Advanced Organic Chemistry Reactions, Mechanisms and Structure 248-272 (4th ed., 1992) ("March") (Year: 1992).*
International Search Report for PCT/US2021/039773 dated Sep. 15, 2021, 6 pages.
Machine assisted English translation of RU2277106C1 obtained from https://patents.google.com/patent on Apr. 27, 2023, 8 pages.
Machine assisted English translation of JPH07173178A obtained from https://patents.google.com/patent on Apr. 27, 2023, 10 pages.
Eldred, D.V. et al., "Multifunctional organosilicon compound and related methods, compounds, and compositions", Jul. 9, 2020, pp. 1-4, XP055836524.

(Continued)

*Primary Examiner* — Alexander R Pagano
*Assistant Examiner* — Frank S. Hou
(74) *Attorney, Agent, or Firm* — Warner Norcross + Judd LLP

(57) ABSTRACT

A method of preparing a multifunctional organosilicon compound is provided. The method comprises reacting (A) an organosilanol compound comprising a functional moiety selected from alkoxysilyl moieties and acryloxy moieties and (B) a hydridosilane compound having at least two hydrolysable groups in the presence of (C) an acetate salt. A multifunctional organosilicon compound prepared according to the method is also provided.

11 Claims, No Drawings

(56) References Cited

OTHER PUBLICATIONS

Efimov, Yu T. et al., "Synthesis of organosilicon derivatives of acrylic acids", Journal of General Chemistry USSR, Consultants Bureau, New York, NY, US, vol. 61, No. 10, part 2, Oct. 1, 1991, pp. 2083-2091.
Machine assisted English translation of JP2012121950A obtained from https://worldwide.espacenet.com/ on Apr. 27, 2023, 16 pages.
Aliaga-Lavrijsen, "Hydrolysis and Methanolysis of Silanes Catalyzed by Iridium(III) Bis-N-Heterocyclic Carbene Complexes: Influence of the Wingtip Groups." American Chemical Society. 2014, p. 2378-2385.
Azumanyan, "Aerobic Co or Cu/NHPI-catalyzed oxidation of hydride siloxanes: synthesis of siloxanols." The Royal Society of Chemistry. 2018, p. 1467-1471.
Barak, "Ruthenacyclic Carbamoyl Complexes: Highly Efficient Catalysts for Organosilane Hydrolysis." Eur. J. Inorg. Chem. 2018, p. 4982-4986, Europe.
Cai, et al., "Synthesis of novel polymethacrylates with siloxyl bridging perfluoroalkyl side-chains for hydrophobic application on cotton fabrics." Applied Surface Science, Elsevier Amsterdam, NL, vol. 374, 2016, p. 1-15.
Lee, "Highly Selective and Practical Hydrolytic Oxidation of Organosilanes to Silanols Catalyzed by a Ruthenium Complex." American Chemical Society. J. Am. Chem Soc. 2000, p. 12011-12012.
Lee, "Highly Efficient Iridium-Catalyzed Oxidation of Organosilanes to Silanols." American Chemical Society. J. Org. Chem. 2004, p. 1741-1743, vol. 69.
Li, "Catalytic Cross-Dehydrocoupling Polymerization of 1,4-Bis(dimethylsilyl)benzene with Water. A New Approach to Poly(oxydimethylsilylene)-(1,4-phenylene)(dimethylsilylene)." American Chemical Society. Macromolecules. 1999, p. 3540-3542, vol. 32, No. 10.
Lickiss, "The Synthesis and Structure of Organosilanols." Advances in Inorganic Chemistry. 1995, p. 147-262, vol. 42.
Lin, "Wettability-Driven Palladium Catalysis for Enhanced Dehydrogenative Coupling of Organosilanes." American Chemical Society. ASC Catal. 2017, p. 1720-1727, vol. 7.
Rettig, "Tellurorhodamine photocatalyzed aerobic oxidation of organosilanes and phosphines by visible-light." The Royal Society of Chemistry. Dalton Trans. 2019, p. 5665-5673, vol. 48.
Tan, "Catalytic Hydrogen Generation from the Hydrolysis of Silanes by Ruthenium Complexes." American Chemical Society. 2011, p. 4008-4013, vol. 30.
Yu, "Highly Efficient Generation of Hydrogen from the Hydrolysis of Silanes Catalyzed by [RhCl(CO)2]2." American Chemical Society. Inorg. Chem. 2013, p. 10741-10743, vol. 52.
XP002798068 Chemical Abstracts Service, Columbus, Ohio, US; 1960, retrieved from STN Database accession No. 1960:6433 the whole document.
XP002798069, Chemical Abstracts Service, Columbus, Ohio, US; 1982, retrieved from STN Database accession No. 1982:181341 the whole document.
XP002798070, Chemical Abstracts Service, Columbus, Ohio, US; 1973, retrieved from STN Database accession No. 1973:492376 the whole document.
XP002798071, Chemical Abstracts Service, Columbus, Ohio, US; 2000, retrieved from STN Database accession No. 2000:842144 the whole document.
XP002798072, Chemical Abstracts Service, Columbus, Ohio, US; 2004, retrieved from STN Database accession No. 2004:37123 the whole document.
XP002798073, Chemical Abstracts Service, Columbus, Ohio, US; 2016, retrieved from STN Database accession No. 2016:1372030 the whole document.
Schuyten, H. A., J. Wt Weaver, and J. David Reid. "Preparation of substituted acetoxy silanes." Journal of the American Chemical Society 69.9 (1947): 2110-2112.
Machine assisted English translation of JP2013185066A obtained from https://worldwide.espacenet.com/ on Apr. 28, 2023, 19 pages.
Machine assisted English translation of JPH1180315A obtained from https://worldwide.espacenet.com/ on Apr. 28, 2023, 11 pages.
Machine assisted English translation of JPH11158232A obtained from https://worldwide.espacenet.com/ on Apr. 28, 2023, 13 pages.
Machine assisted English translation of JP2018184395A obtained from https://worldwide.espacenet.com/ on Apr. 28, 2023, 34 pages.
Machine assisted English translation of CN106279233A obtained from https://worldwide.espacenet.com/ on Apr. 28, 2023, 7 pages.

* cited by examiner

PREPARATION OF MULTIFUNCTIONAL ORGANOSILICON COMPOUNDS

CROSS-REFERENCE TO RELATED APPLICATIONS

This application is the U.S. National Stage of International Application No. PCT/US2021/039773 filed on 30 Jun. 2021, which claims priority to and all advantages of U.S. Provisional Patent Application No. 63/046,591 filed on 30 Jun. 2020, the content of which is incorporated herein by reference.

FIELD OF THE INVENTION

The present invention generally relates to organosilicon compounds and, more specifically, to a method of preparing a multifunctional organosilicon compound, a multifunctional organosilicon compound prepared therewith, and functionalized siloxanes prepared therefrom.

DESCRIPTION OF THE RELATED ART

Organosilicon materials are known in the art and are utilized in myriad end use applications and environments. For example, organopolysiloxanes are utilized in numerous industrial, home care, and personal care formulations. Increasingly, hybrid materials having both silicone and organic functionality are utilized in such formulations, as such hybrid materials may exhibit combined benefits traditionally associated with only silicone materials or organic materials. However, many methods of preparing hybrid materials require functional organosilicon compounds, which are often difficult to synthesize and/or utilize. Moreover, many conventional organosilicon materials have limited functionality that can be exploited in the preparation of hybrid materials. In particular, traditional methods of preparing certain functional organosilicon compounds are often incompatible with many silicone materials (e.g. via promoting silicone rearrangements, unselective reactions, degradation, hydrolysis of functional groups, etc.), resulting in decreased yields and purities, and limiting general applicability of such methods.

BRIEF SUMMARY

The present disclosure provides a method of preparing a multifunctional organosilicon compound. The method includes reacting (A) an organosilanol compound (B) a hydridosilane compound in the presence of (C) an acetate salt, thereby preparing the multifunctional organosilicon compound. The organosilanol compound (A) comprises a functional moiety selected from alkoxysilyl moieties and acryloxy moieties, and the hydridosilane compound (B) comprises at least two hydrolysable groups.

A multifunctional organosilicon compound prepared according to the method is also provided. The multifunctional organosilicon compound has following general formula:

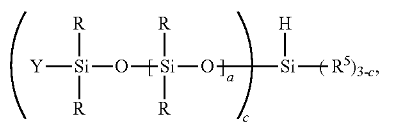

where each Y independently comprises a functional moiety selected from alkoxysilyl moieties and acryloxy moieties; each R is an independently selected hydrocarbyl group; each $R^5$ is an independently selected hydrocarbyl group; each subscript a is independently 0, 1 or 2; and subscript c is 2 or 3.

DETAILED DESCRIPTION OF THE INVENTION

A method of preparing a multifunctional organosilicon compound is provided herein. The multifunctional organosilicon compound prepared comprises two different types of functional groups, including at least one hydrosilylatable group, and is thus useful in preparing functionalized siloxane compounds, as well as in compositions and methods for preparing curable compositions (e.g. as capping agents, etc.) and various components thereof, such as those based on one or more silicones, e.g. as a starting material, reagent, building block, functionalizing compound, etc.

The method includes reacting (A) an organosilanol compound and (B) a hydridosilane compound in the presence of (C) an acetate salt. The method prepares the multifunctional organosilicon compound via a condensation-type addition reaction (the "reaction"), which will be appreciated from the description herein. In particular, the organosilanol compound (A), the hydridosilane compound (B), and the acetate salt (C) are described in turn below, along with additional components that may be utilized in the method, which may be collectively referred to herein as the "components" of the method (i.e., "component (A)", "component (B)", "component (C)", etc., respectively.) or, likewise, as "starting material(s)," "compound(s)," and/or "reagent(s)" (A), (B), and/or (C), etc.

As introduced above, component (A) is an organosilanol compound, i.e., an organosilicon compound having at least one silicon-bonded hydroxy group (i.e., a Si—OH group, silanol group, etc.). The organosilanol compound (A) also comprises a functional moiety, which, as described in further detail below, is selected from alkoxysilyl moieties and acryloxy moieties.

Typically, the organosilanol compound (A) has the following general formula:

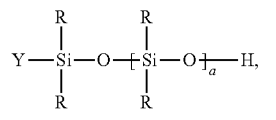

where Y is the functional moiety selected from alkoxysilyl moieties and acryloxy moieties, each R is an independently selected hydrocarbyl group, and subscript a is 0, 1, or 2. When the functional moiety Y is an alkoxysilyl moiety, component (A) may be further defined as an alkoxysilyl-functional organosilanol compound. Similarly, when the functional moiety Y is an acryloxy moiety, component (A) may be further defined as an acryloxy-functional organosilanol compound.

With regard to the general formula of component (A) above, each R is an independently selected hydrocarbyl group. Suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., R may include one or more heteroatoms (oxygen, sulfur, nitrogen, etc.) within a carbon chain), or both. As such, it will be appreciated that R may comprise, or be, a hydrocarbon moiety having one or more substituents in and/or on (i.e., appended to and/or integral with) a carbon chain/backbone thereof, such that R may comprise, or be, an ether, an ester, etc.

In general, hydrocarbyl groups suitable for R may independently be linear, branched, cyclic, or combinations thereof. Linear and branched hydrocarbyl groups may independently be saturated or unsaturated. Cyclic hydrocarbyl groups encompass aryl groups as well as saturated or non-conjugated cyclic groups. Cyclic hydrocarbyl groups may independently be monocyclic or polycyclic. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. isopropyl and/or n-propyl), butyl (e.g. isobutyl, n-butyl, tert-butyl, and/or sec-butyl), pentyl (e.g. isopentyl, neopentyl, and/or tert-pentyl), hexyl, as well as branched saturated hydrocarbon groups, e.g. having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups. Typically, each R is an independently selected substituted or unsubstituted hydrocarbyl group. For example, in some embodiments each R is independently selected from unsubstituted hydrocarbyl groups, such as linear or unbranched unsubstituted hydrocarbyl groups. In some such embodiments, each R is independently selected from unsubstituted hydrocarbyl groups having from 1 to 18 carbon atoms, such as from 1 to 12, alternatively from 1 to 10, alternatively from 1 to 6 carbon atoms.

Each R may be the same as or different from any other R in the organosilanol compound (A). In certain embodiments, each R is the same. In other embodiments, at least one R is different than at least one other R of the organosilanol compound (A). In certain embodiments, each R is independently selected from alkyl groups, such as methyl groups, ethyl groups, etc. In specific embodiments, each R is methyl.

With further regard to the general formula of component (A) above, functional moiety Y is selected from alkoxysilyl moieties and acryloxy moieties. Said differently, functional moiety Y comprises at least one independently selected alkoxysilyl or acryloxy substituent. The alkoxysilyl or acryloxy substituent of the functional moiety Y may be bonded directly (e.g. via covalent bond) or indirectly (e.g. via divalent linking group) to the silicon atom shown in the general formula of the organosilanol compound (A) above (i.e., the siloxane backbone of the organosilanol compound (A)). In certain embodiments, the alkoxysilyl or acryloxy substituent of the functional moiety Y is bonded directly to the siloxane backbone of the organosilanol compound (A), such that Y itself represents an alkoxysilyl or acryloxy group, as described below. In other embodiments, the alkoxysilyl or acryloxy substituent of the functional moiety Y is bonded indirectly to the siloxane backbone of the organosilanol compound (A), e.g. via a linking group.

For example, in some embodiments, functional moiety Y has the formula $R^1$-D-, where $R^1$ comprises an alkoxysilyl group or an acryloxy group, as described in further detail below, and D is a linking group. More specifically, in such embodiments, linking group D is an independently selected divalent linking group, which may be linear or branched and substituted or unsubstituted. Typically, linking group D is selected from divalent substituted or unsubstituted hydrocarbon groups. For example, in some embodiments, linking group D comprises a hydrocarbon moiety having the formula $-(CH_2)_m-$, where subscript m is from 1 to 16, alternatively from 1 to 6. In these or other embodiments, linking group D may comprise a substituted hydrocarbon, i.e., a hydrocarbon group comprising a backbone having at least one heteroatom (e.g. O, N, S, etc.). For example, in some embodiments, linking group D is a hydrocarbon having a backbone comprising an ether moiety.

In general, $R^1$ is independently selected from alkoxysilyl groups and acryloxy groups. These groups are not particularly limited, and are exemplified by the general and specific examples below. As such, alternative alkoxysilyl groups and/or acryloxy groups, will be readily envisaged by one of skill in the art in view of the description herein.

In certain embodiments, $R^1$ is an alkoxysilyl group, such that the functional moiety Y is the alkoxysilyl moiety, and component (A) may be further defined as the alkoxysilyl-functional organosilanol compound (A) as introduced above. In such embodiments, $R^1$ is typically an alkoxysilyl group having the following formula:

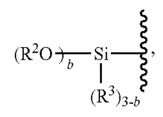

where subscript b is 1, 2, or 3, $R^2$ is an independently selected hydrocarbyl group in each moiety indicated by subscript b, and each $R^3$ is an independently selected hydrocarbyl group.

The alkoxysilyl group $R^1$ may be further defined as a mono, di, or trialkoxysilyl group, i.e., when subscript b is 1, 2, or 3, respectively. Typically, subscript b is 2 or 3, such that the alkoxysilyl group $R^1$ comprises at least two alkoxy groups represented by the subformula $R^2O$— above. In such embodiments, each $R^2$ may be the same as or different from any other $R^2$ in the alkoxysilyl group $R^1$.

Examples of hydrocarbyl groups suitable for $R^2$ and, where present, and $R^3$ (i.e., when subscript b is 1 or 2) generally include those described with respect to R above.

Typically, each $R^2$ and $R^3$ is independently selected from alkyl groups, such as methyl groups, ethyl groups, etc. In such instances, the alkoxysilyl group $R^1$ may be defined as a trialkoxysilyl, dialkoxyalkylsilyl, or alkoxyldialkylsilyl group, i.e., where subscript b is 3, 2, or 1, respectively.

In certain embodiments, each $R^2$ is methyl or ethyl. In these or other embodiments, each $R^3$ is methyl or ethyl. In specific embodiments, each $R^2$ and $R^3$ in the alkoxysilyl group $R^1$ is methyl. For example, in specific embodiments, subscript b is 3 and each $R^2$ is methyl, such that $R^1$ is a trimethoxysilyl group (e.g. is of formula $(CH_3O)_3Si$—). Likewise, in other embodiments, subscript b is 3 and each $R^2$ is ethyl, such that $R^1$ is a triethoxysilyl group (e.g. is of formula $(CH_3CH_2O)_3Si$—). In some embodiments, subscript b is 2, each $R^2$ is methyl, and $R^2$ is methyl, such that $R^1$ is a trimethoxysilyl group (e.g. is of formula $(CH_3CH_2O)_3$ Si—).

In certain embodiments, $R^1$ is an acryloxy group, such that the functional moiety Y is the acryloxy moiety, and component (A) may be further defined as the acryloxy-functional organosilanol compound (A) as introduced above. In such embodiments, $R^1$ is typically an acryloxy group having the following formula:

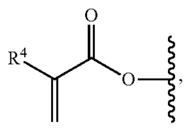

where $R^4$ is an independently selected hydrocarbyl group or H. Examples of hydrocarbyl groups suitable for $R^4$ include those described with respect to R above. For example, $R^4$ may comprise, or be, a substituted or unsubstituted hydrocarbyl group, such as those having from 1 to 4 carbon atoms.

In certain embodiments, $R^4$ is H, such that the acryloxy group $R^1$ may be defined as an acrylate group. In other embodiments, $R^4$ is selected from substituted or unsubstituted hydrocarbyl groups, such as any of those described above with respect to R. In some such embodiments, $R^4$ is an alkyl group, such that the acryloxy group $R^1$ may be defined as an alkylacrylate group. Examples of such alkyl groups include methyl, ethyl, propyl groups (n-propyl, iso-propyl), and butyl groups (e.g. n-butyl, sec-butyl, iso-butyl, t-butyl) groups. In specific embodiments, $R^4$ is methyl, such that the acryloxy group $R^1$ may be defined as a methacrylate group.

With continued regard to the general formula of component (A) above, subscript a of the organosilanol compound (A) is 0, 1, or 2. For example, in certain embodiments, subscript a is 0 and the organosilanol compound (A) has the following formula:

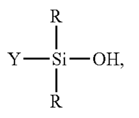

where each R and Y are as described above. In some such embodiments, each R is methyl, such that the organosilanol compound (A) has the formula $YSi(CH_3)_2OH$, where Y is as described above.

In other embodiments, subscript a is 1 and the organosilanol compound (A) has the following formula:

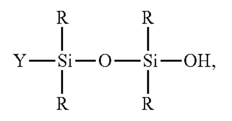

where each R and Y are as described above. In some such embodiments, each R is methyl, such that the organosilanol compound (A) has the formula $YSi(CH_3)_2OSi(CH_3)_2OH$, where Y is as described above.

In yet other embodiments, subscript a is 2 and the organosilanol compound (A) has the following formula:

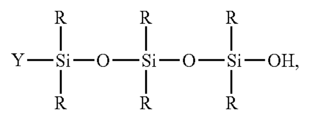

where each R and Y are as described above. In some such embodiments, each R is methyl, such that the organosilanol compound (A) has the formula $YSi(CH_3)_2OSi(CH_3)_2OSi(CH_3)_2OH$, where Y is as described above.

The organosilanol compound (A) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof. In certain embodiments, the organosilanol compound (A) is utilized in the absence of a carrier vehicle. In some such embodiments, the organosilanol compound (A) is utilized absent water and carrier vehicles/volatiles reactive with the organosilanol compound (A) and/or the hydridosilane compound (B). For example, in certain embodiments, the method may comprise stripping the organosilanol compound (A) of volatiles and/or solvents (e.g. organic solvents, water, etc.). Techniques for stripping the organosilanol compound (A) are known in the art, and may include distillation, heating, applying reduced pressure/vacuum, azeotroping with solvents, utilizing molecular sieves, etc., and combinations thereof.

The organosilanol compound (A) may be utilized in any amount, which will be selected by one of skill in the art, e.g. dependent upon the particular hydridosilane compound (B) selected, the reaction parameters employed, the scale of the reaction (e.g. total amounts of component (A) and/or (B) to be reacted and/or the multifunctional organosilicon compound to be prepared), etc.

In certain embodiments, the method comprises utilizing more than one organosilanol compound (A), such as 2, 3, 4, or more organosilanol compounds (A). In such embodiments, each organosilanol compound (A) is independently selected, and may be the same as or different from any other organosilanol compound (A) (e.g. in terms of the siloxane backbone, functional moiety Y, substituents R, etc.).

For example, in certain embodiments, the organosilanol compound (A) comprises a mixture of compounds where functional moiety Y has the formula $R^1$-D- as described above, which compounds differ from one another with respect to the divalent linking group D. In some such embodiments, each D is linear or branched hydrocarbon group, and the organosilanol compound (A) comprises a ratio of compounds having linear or branched group D of 50:50, alternatively of 65:35, alternatively of >90:10, alternatively of >95:5 (linear:branched). In certain such embodiments, each linking group D is a linear hydrocarbon group in at least 70, alternatively at least 75, alternatively at least 80, alternatively at least 85, alternatively at least 90, alternatively at least 95, mol % of molecules utilized in component (A) having the general formula of the organosilanol compound (A) above.

The organosilanol compound (A) may be provided or otherwise obtained "as is", i.e., ready for the reaction to prepare the multifunctional organosilicon compound, or alternatively may be prepared as part of the method. For example, in some embodiments, the method further comprises preparing the organosilanol compound (A).

As understood by those of skill in the art, condensation of an Si—OH group with an Si—Cl group may happen directly, or indirectly by initial hydrolysis of the Si—Cl group to an Si—OH group and subsequent condensation of the two Si—OH groups. As such, it is to be appreciated that preparing the organosilanol compound (A) may be carried out via hydrolysis of a halogen-functional organosilicon compound, such as a chlorine-functional organosilicon compound having the formula:

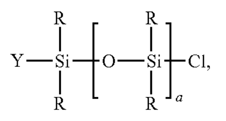

where each R, Y, and subscript a are as described above with respect to the organosilanol compound (A). As such, while the organosilanol compound (A) is described herein in terms of silanol functionality (i.e., the Si—OH group thereof), it is also to be appreciated that, under specific conditions, the preceding chlorine-functional organosilicon compound may itself be reacted with one or more hydrolysis reaction products of component (B), as described below, which itself would comprise one or more Si—OH groups. In such instances, the organosilanol compound (A) would not itself become a silanol (i.e., Si—OH group-functional) during the method. As such, the term "organosilanol" used in regard to the organosilanol compound (A) is not to be limiting, and is to be understood to encompass halogen-functional organosilicon compounds that are readily converted to the corresponding organosilanol compounds under hydrolysis conditions.

As introduced above, component (B) is a hydridosilane compound, i.e., a silicon compound having at least one silicon-bonded hydrogen atom (i.e., a Si—H group) per molecule. The hydridosilane compound (B) also typically comprises at least two hydrolysable groups (i.e., two silicon-bonded groups capable of undergoing hydrolysis, e.g. during a condensation reaction).

Typically, the hydridosilane compound (B) has the following general formula:

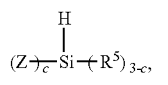

where each Z is an independently selected hydrolysable group, each $R^5$ is an independently selected hydrocarbyl group, and subscript c is 2 or 3.

In certain embodiments, subscript c is 2 and the hydridosilane compound (B) has the following formula:

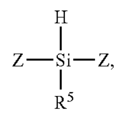

where each Z and $R^5$ are as described herein. In other embodiments, subscript c is 3 and the hydridosilane compound (B) has the formula:

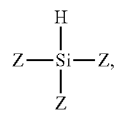

where each Z is as described herein.

Each hydrolysable group Z is independently selected, and may be the same as or different from any other hydrolysable group Z in the hydridosilane compound (B). In certain embodiments, each hydrolysable group Z is the same. In other embodiments, at least one hydrolysable group Z is different than at least one other hydrolysable group Z of the hydridosilane compound (B). Hydrolysable groups suitable for the hydridosilane compound (B) are not limited, and may be any group capable of facilitating condensation of the silanol group of the organosilanol compound (A) with the hydridosilane compound (B).

In certain embodiments, each hydrolysable group Z is independently selected from halogens (e.g. chlorine, bromine, etc.), alkoxy groups (e.g. methoxy groups, ethoxy groups, propoxy groups, butoxy groups, phenoxy groups, etc.), carboxy groups (e.g. acetoxy), oxime groups (e.g. $—ONC(CH_2CH_3)_2$), and aminoxy groups (e.g. $—ON(CH_2CH_3)_2$). In particular embodiments, each hydrolysable group Z is a halogen. In specific embodiments, each hydrolysable group Z is chlorine.

In some embodiments, each hydrolysable group Z is selected particularly in view of the particular functional moiety Y utilized in the organosilanol compound (A). For example, in particular embodiments, compound (A) is the alkoxysilyl-functional organosilanol compound (A) described above, and the hydridosilane compound (B) is free from alkoxysilyl groups (i.e., each hydrolysable group Z is other than alkoxy, such as halogen, etc.).

Substituent $R^5$ of the hydridosilane compound (B), where present (i.e., where subscript c is 2, as described above), is a hydrocarbyl group. Suitable hydrocarbyl groups may be substituted or unsubstituted, and are exemplified by the hydrocarbyl groups described above with respect to substituent R of the organosilanol compound (A) above. Typically, $R^5$ is selected from alkyl groups, such as methyl groups, ethyl groups, etc. For example, in certain embodiments, $R^5$ is methyl. However, aryl, alkaryl, and other types of hydrocarbyl groups may also be utilized as $R^5$. Additionally, $R^5$ may be substituted, as described above, internally, terminally, and/or pendantly with respect to the hydrocarbon chain of the hydrocarbyl group selected.

In specific embodiments, each hydrolysable group Z is Cl and $R^5$, when present, is methyl. In such embodiments, the hydridosilane compound (B) is exemplified by dichloromethylsilane (i.e., where subscript c is 2) and trichlorosilane (i.e., where subscript c is 3).

The hydridosilane compound (B) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof.

In some embodiments, the hydridosilane compound (B) is utilized in the absence of water and carrier vehicles/volatiles reactive with the organosilanol compound (A) and/or the hydridosilane compound (B). For example, in certain embodiments, the method may comprise stripping the hydridosilane compound (B) of volatiles and/or solvents (e.g. water, reactive solvents, etc.). Techniques for stripping the hydridosilane compound (B) are known in the art, and may include heating, drying, applying reduced pressure/vacuum, azeotroping with solvents, utilizing molecular sieves, etc., and combinations thereof.

In certain embodiments, the method comprises utilizing more than one hydridosilane compound (B), such as 2, 3, 4, or more hydridosilane compounds (B). In such embodiments, each hydridosilane compound (B) is independently selected, and may be the same or different from any other hydridosilane compound (B), e.g. in terms of the hydrolysable groups Z, the number of hydrolysable groups Z (i.e., as represented by subscript c), etc.).

The hydridosilane compound (B) may be utilized in any amount, which will be selected by one of skill in the art, e.g. dependent upon the particular organosilanol compound (A) selected, the reaction parameters employed, the scale of the reaction (e.g. total amount of component (A) to be converted and/or multifunctional organosilicon compound to be prepared), etc.

The relative amounts of the organosilanol compound (A) and the hydridosilane compound (B) utilized may vary, e.g. based upon the particular organosilanol compound (A) selected, the particular hydridosilane compound (B) selected, the reaction parameters employed, etc. As understood by those of skill in the art, the theoretical maximum molar ratio of the reaction (i.e., the stoichiometric ratio for complete reaction) of components (A) and (B) depends on subscript c, i.e., the number of hydrolysable groups Z. For example, when subscript c is 2 (i.e., the hydridosilane compound (B) has two hydrolysable groups Z), components (A) and (B) can be reacted in a 2:1 molar ratio (A):(B). Likewise, when subscript c is 3 (i.e., the hydridosilane compound (B) has three hydrolysable groups Z), components (A) and (B) can be reacted in a 3:1 molar ratio (A):(B).

Regardless of the particular theoretical maximum molar ratio of the reaction, an excess of one of the components is typically utilized to fully consume one of components (A) or (B), e.g. to simplify purification of the reaction product formed. As such, in certain embodiments, the organosilanol compound (A) and the hydridosilane compound (B) are reacted in a molar ratio of from 10:1 to 1:10 (A):(B), such as from 8:1 to 1:8, alternatively of from 6:1 to 1:6, alternatively of from 4:1 to 1:4 (A):(B). In specific embodiments, the organosilanol compound (A) is utilized in relative excess (i.e., stoichiometric excess, e.g. where the molar equivalent ratio of (A) to (B) is greater than subscript c) to maximize a conversion rate of component (B) to the multifunctional organosilicon compound. In such embodiments, the organosilanol compound (A) and the hydridosilane compound (B) are reacted in a molar ratio of from 6:1 to >2:1, such as from 5:1 to >2:1, alternatively of from 4:1 to >2:1, alternatively of from 3:1 to >2:1 (A):(B). In specific such embodiments, the organosilanol compound (A) and the hydridosilane compound (B) are reacted in a molar ratio of from 3.5:1 to >3.01:1 (A):(B) (e.g. when subscript c is 3 such that the hydridosilane compound (B) has three hydrolysable groups Z), alternatively of from 2.5:1 to 2.01:1 (A):(B) (e.g. when subscript c is 2 such that the hydridosilane compound (B) has two hydrolysable groups Z).

In other embodiments, the hydridosilane compound (B) is utilized in relative excess (i.e., stoichiometric excess, e.g. where the molar equivalent ratio of (A) to (B) is less than subscript c) to maximize a conversion rate of component (A) to the multifunctional organosilicon compound. In such embodiments, the organosilanol compound (A) and the hydridosilane compound (B) are reacted in a stoichiometric ratio of ≤1:1 (A):(B). For example, in some such embodiments, the organosilanol compound (A) and the hydridosilane compound (B) are reacted in a molar ratio of from ≤3:1 (A):(B) (e.g. when subscript c is 3 such that the hydridosilane compound (B) has three hydrolysable groups Z), alternatively of ≤2:1 (A):(B) (e.g. when subscript c is 2 such that the hydridosilane compound (B) has two hydrolysable groups Z).

It will be appreciated that ratios outside of these ranges may be utilized as well. For example, in certain embodiments, the organosilanol compound (A) is utilized in a gross excess (e.g. in an amount of ≥10, alternatively ≥15, alternatively ≥20, times the molar amount of the hydridosilane compound (B)), such as when the organosilanol compound (A) is utilized as a carrier (i.e., a solvent, diluent, etc.) during the reaction. In other embodiments, the hydridosilane compound (B) is utilized excess of component (A), alternatively in a gross excess (e.g. in an amount of ≥10, alternatively ≥15, alternatively ≥20, times the molar amount of the organosilanol compound (A)), such as when the hydridosilane compound (B) is utilized as a carrier (i.e., a solvent, diluent, etc.) during the reaction.

As introduced above, component (C) is an acetate salt, i.e., a complex comprising an acetate anion. The acetate salt (C) is not otherwise particularly limited.

As will be understood by those of skill in the art, acetate salts will generally include a counterion (e.g. a cation, or combination of cations), which may be selected from organic cations (e.g. quaternary ammonium cations, such as imidazolium, pyridinium, and pyrrolidinium cations; sulfonium cations; phosphonium cations; etc.), inorganic cations (e.g. metal cations), and combinations thereof. Specific examples of suitable cations include those of alkali metals (e.g. lithium (Li), sodium (Na), potassium (K), etc.) and alkaline earth metals (e.g. beryllium (Be), magnesium (Mg), calcium (Ca), barium (Ba), etc.).

In certain embodiments, the acetate salt (C) comprises a complex having the general formula $[R^6C(O)O]^-[M]^+$, where $R^6$ is a substituted or unsubstituted methyl group and M is an alkali metal.

It will be appreciated that the moiety indicated by the subformula $[R^6C(O)O]^-$ may be defined, or otherwise referred to, as an acetate (i.e., an acetate ion, an acetate anion, etc.), which term generally encompasses the conjugate base of an acetic acid. It is to be understood in view of the description of substituent $R^6$ herein, however, that the acetate of the acetate salt (C) may be a higher-order carboxylate anion (e.g. a propionate, butyrate, etc.) or other acetate derivative (e.g. fluoroacetate, dichloroacetate, etc.), which collective fall within the scope of the substituted or unsubstituted methyl groups represented by substituent $R^6$ in the general formula above.

For example, in certain embodiments, $R^6$ is an unsubstituted methyl group, such that the salt complex of component (C) has the formula $[H_3CC(O)O]^-[M]^+$, where M is as described herein. In other embodiments, substituent $R^6$ is a substituted methyl group having the formula $(R^7)_3C$—, where each $R^7$ is independently selected from H, halogens (e.g. F, Cl, Br, etc.), and hydrocarbyl groups.

Examples of suitable hydrocarbyl groups for $R^7$ include any of those described above with regard to substituent R of the organosilanol compound (A) above. Typically, hydrocarbyl groups for $R^7$ are selected from alkyl groups, such as methyl groups, ethyl groups, etc., and aryl groups, such as phenyl groups, benzyl groups, etc. For example, in certain embodiments, at least one $R^7$ may be methyl, such that the salt complex of component (C) may be further or alternatively defined as a propionate ion. However, aryl, alkaryl, and other types of hydrocarbyl groups may also be utilized as $R^7$.

In certain embodiments, each $R^7$ is independently selected from H, F, Cl, unsubstituted alkyl groups having from 1 to 4 carbon atoms, and phenyl groups. In some such embodiments, at least two of $R^7$ are H. In specific embodiments, each $R^7$ is H, such that $R^6$ is the unsubstituted methyl group introduced above.

The alkali metal M not particularly limited, and may comprise, or be, lithium (Li), sodium (Na), potassium (K), rubidium (Rb), cesium (Cs), or combinations thereof (e.g. when the acetate salt (C) is a mixed salt comprising more than one cation). In certain embodiments, M comprises sodium and/or potassium (K). In particular embodiments, M is sodium, such that the acetate salt (C) may be further defined as a sodium acetate compound. In specific embodiments, the acetate salt (C) comprises, alternatively is, sodium acetate, e.g. the complex having the chemical formula $NaCO_2CH_3$, which is conventionally abbreviated as NaOAc.

With regard to the acetate salt (C) in general, it will be appreciated that compounds comprising an average of more than one acetate ion in a given complex may also be utilized, such as polyacetate salts, e.g. where polycationic and/or bridging counterions are utilized. For example, it will be understood that certain alkali metal diacetate salts (e.g. sodium diacetate) and/or alkaline earth metal acetates (e.g. calcium diacetate, otherwise known simple as calcium acetate) may also be utilized in the method. Likewise, in certain embodiments, the method comprises utilizing more than one acetate salt (C), such as 2, 3, 4, or more acetate salts (C). In such embodiments, each acetate salt (C) is independently selected, and may be the same or different from any other acetate salt (C), e.g. in terms of the acetate anion, the counter cation, etc.

Methods of preparing the acetate salt (C) are well known in the art, with the particular compounds described and/or represented by the formulas above and/or compounds used to prepare the same being commercially available from various suppliers. As such, the acetate salt (C) may be prepared as part of the method, or otherwise obtained (i.e., as a prepared compound). Likewise, preparations of the acetate salt (C) may be formed prior to the reaction of components (A) and (B), or in situ (i.e., during the reaction of components (A) and (B)).

The acetate salt (C) may be utilized in any form, such as neat (i.e., absent solvents, carrier vehicles, diluents, etc.), or disposed in a carrier vehicle, such as a solvent or dispersant (e.g. such as any of those listed above with respect to the organosilanol compound (A)). In some embodiments, the acetate salt (C) is utilized in the absence of water (e.g. anhydrously) and carrier vehicles/volatiles reactive with the organosilanol compound (A), the hydridosilane compound (B), and/or the acetate salt (C) itself (i.e., until combined with components (A) and/or (B). For example, in certain embodiments, the method may comprise stripping the acetate salt (C) of volatiles and/or solvents (e.g. water, organic solvents, etc.). Techniques for stripping the acetate salt (C) are known in the art, and may include heating, drying, applying reduced pressure/vacuum, azeotroping with solvents, utilizing molecular sieves, etc., and combinations thereof.

The acetate salt (C) may be utilized in any amount, which will be selected by one of skill in the art, e.g. dependent upon the particular acetate salt (C) selected, the reaction parameters employed, the scale of the reaction (e.g. total amounts of components (A) and (B)), etc. In general, the molar ratio of the acetate salt (C) to component (B) utilized in the reaction may influence the rate and/or amount of the reaction of components (A) and (B) to prepare the multifunctional organosilicon compound therewith. Thus, the amount of the acetate salt (C) as compared to components (A) and/or (B), as well as the molar ratios there between, may vary. Typically, these relative amounts and the molar ratio are selected to maximize coupling of components (A) and (B) and/or full conversion of one or both components (e.g. for increased economic efficiency of the reaction, increased ease of purification of the reaction product formed, etc.).

While the reaction utilized to prepare the multifunctional organosilicon compound is not limited to a particular mechanism and/or type, it is believed that under the conditions employed in the method, components (B) and (C) react to prepare an acetoxyhydridosilane intermediate, e.g. via in situ condensation of the acetate anion of component (C) and the silicon atom of component (B) facilitated by one or more of the hydrolysable groups thereof (e.g. substituent Z above). As understood by those of skill in the art, the theoretical maximum molar ratio of the reaction (i.e., the stoichiometric ratio for complete reaction) of components (B) and (C) depends on subscript c, i.e., the number of hydrolysable groups Z, of the hydridosilane compound (B). For example, when subscript c is 2 (i.e., the hydridosilane compound (B) has two hydrolysable groups Z), components (B) and (C) can be reacted in a 2:1 molar ratio (C):(B). Likewise, when subscript c is 3 (i.e., the hydridosilane compound (B) has three hydrolysable groups Z), components (A) and (B) can be reacted in a 3:1 molar ratio (C):(B).

As but one example to illustrate the formation of the acetoxyhydridosilane intermediate, it is to be appreciated that in embodiments where the hydridosilane compound (B) is dichloromethylsilane (i.e., where subscript c is 2, $R^5$ is methyl, and each Z is Cl) and the acetate salt (C) is sodium acetate (i.e., NaOAc), the acetoxyhydridosilane intermediate will have the general formula $(AcO)_{c'}(Cl)_{2-c'}SiHCH_3$, where subscript c' is 1 or 2 in each molecule corresponding to this formula. However, one of skill in the art will also understand that the average value of subscript c' for the acetoxyhydridosilane intermediate as a whole may be influenced by the relative amounts of components (B) and (C) utilized. For example, when a stoichiometric excess of component (C) is utilized in the preceding illustrative embodiments, the average value of subscript c' for the acetoxyhydridosilane intermediate as a whole can approach 2, which the theoretical maximum based on the stoichiometric maximum molar ratio of the desired reaction of components (B) and (C) (i.e., the stoichiometric ratio for a complete reaction).

As will be appreciated from the preceding description, the acetate salt (C) is typically utilized on a stoichiometric equivalent, or excess, basis in relation to the hydridosilane compound (B) to maximize a conversion rate of component (B) to the acetoxyhydridosilane intermediate. As such, the hydridosilane compound (B) and the acetate salt (C) are typically utilized in a molar ratio of ≤1:2 (B):(C) when subscript c is 2 (i.e., where the hydridosilane compound (B) has two hydrolysable groups Z), alternatively of ≤1:3 (B):(C) when subscript c is 3 (i.e., where the hydridosilane compound (B) has three hydrolysable groups Z). For example, in some embodiments the acetate salt (C) is used in an amount sufficient to provide relative a molar ratio to the hydridosilane compound (B) of from <1:1 to 1:10 (B):(C). For example, in certain embodiments, the acetate salt (C) and the hydridosilane compound (B) are utilized in a molar ratio of from 1:2 to 1:10, such as from 1:2 to 1:5, alternatively of from <1:2 to 1:5, alternatively of from <1:2 to 1:4, alternatively of from 1:2.1 to 1:3.1 (B):(C). It will be appreciated that ratios outside of these ranges may be utilized as well. For example, in certain embodiments, the acetate salt (C) is utilized in a gross excess (e.g. in an amount of ≥10, alternatively ≥15, alternatively ≥20, times the molar amount of the hydridosilane compound (B)).

In certain embodiments, the particular type and relative amounts of components (A), (B), and (C) are selected such that the reactivity of certain byproducts of the reaction are minimized or otherwise reduced with regard to the reaction components and/or reaction product. For example, in certain embodiments, the hydrolysable groups Z of the hydridosilane compound (B) are each chlorine, such that the overall condensation of the silanol of component (A) with the hydridosilane compound (B) (i.e., directly and/or via the acetoxyhydridosilane intermediate) produces HCl as a byproduct. In such embodiments, the acetate salt (C) may be utilized in an amount (e.g. in excess of the stoichiometric amount needed to prepare the acetoxyhydridosilane intermediate) selected to prepare a buffer system within the reaction mixture, thereby reducing the reactivity of the HCl with components (A) and/or (B) by forming a chloride salt (e.g. NaCl) and the conjugate acid of the acetate anion (e.g. AcOH).

In certain embodiments, the method includes reacting components (A) and (B) in the presence of (D) a reaction inhibitor. The reaction inhibitor (D) is not limited, and may comprise, alternatively may be, any compound or composition capable of preventing, suppressing, or otherwise inhibiting a reaction (e.g. a reaction other than desired and/or necessary for the preparation of the multifunctional organosilicon compound. For example, in some embodiments, e.g. where the organosilanol compound (A) is acryloxy functional, the reaction inhibitor (D) comprises, alternatively is, a polymerization inhibitor.

The polymerization inhibitor is not limited, and may comprise, alternatively may be, a radical scavenger, an antioxidant, a light stabilizer, a UV-absorber, or the like, or a combination thereof. Such compounds are known in the art, and generally are, or include, a chemical compound or moiety capable of interacting with a free radical to render the free radical inactive, e.g. via elimination the free radical through the formation of a covalent bond therewith. The polymerization inhibitor may also, or alternatively, be a polymerization retardant, i.e., a compound that reduces the rate of initiation and/or propagation of a radical polymerization. For example, in some embodiments, the polymerization inhibitor comprises, alternatively is, oxygen gas. In general, the polymerization inhibitor is utilized to prevent and/or suppress the formation of byproducts that may be formed via radical polymerization of the organosilanol compound (A) and/or the multifunctional organosilicon compound (e.g. when comprising an acryloxy moiety.).

In certain embodiments, the polymerization inhibitor comprises, alternatively is, a phenolic compound, a quinone or hydroquinone compound, an N-oxyl compound, a phenothiazine compound, a hindered amine compound, or a combination thereof.

Examples of phenolic compounds include phenol, alkylphenols, aminophenols (e.g. p-aminophenol), nitrosophenols, and alkoxyphenols. Specific examples of such phenol compounds include o-, m- and p-cresol(methylphenol), 2-tert-butyl-4-methylphenol, 6-tert-butyl-2,4-dimethylphenol, 2,6-di-tert-butyl-4-methylphenol, 2-tert-butylphenol, 4-tert-butylphenol, 2,4-di-tert-butylphenol, 2-methyl-4-tert-butylphenol, 4-tert-butyl-2,6-dimethylphenol or 2,2'-methylenebis(6-tert-butyl-4-methylphenol), 4,4'-oxybiphenyl, 3,4-methylenedioxydiphenol (sesamol), 3,4-dimethylphenol, pyrocatechol (1,2-dihydroxybenzene), 2-(1'-methylcyclohex-1'-yl)-4,6-dimethylphenol, 2- or 4-(1'-phenyleth-1'-yl)phenol, 2-tert-butyl-6-methylphenol, 2,4,6-tris-tert-butylphenol, 2,6-di-tert-butylphenol, nonylphenol, octylphenol, 2,6-dimethylphenol, bisphenol A, bisphenol B, bisphenol C, bisphenol F, bisphenol S, 3,3',5,5'-tetrabromobisphenol A, 2,6-di-tert-butyl-p-cresol, methyl 3,5-di-tert-butyl-4-hydroxybenzoate, 4-tert-butylpyrocatechol, 2-hydroxybenzyl alcohol, 2-methoxy-4-methylphenol, 2,3,6-trimethylphenol, 2,4,5-trimethylphenol, 2,4,6-trimethylphenol, 2-isopropylphenol, 4-isopropylphenol, 6-isopropyl-m-cresol, n-octadecyl β(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris-(3,5-di-tert-butyl-4-hydroxybenzyl)benzene, 1,3,5,-tris(3,5-di-tert-butyl-4-hydroxybenzyl)isocyanurate, 1,3,5-tris(3,5-di-tert-butyl-4-hydroxyphenyl)propionyloxyethyl isocyanurate, 1,3,5-tris(2,6-dimethyl-3-hydroxy-4-tert-butylbenzyl)isocyanurate or pentaerythrityl tetrakis[p-(3,5-di-tert-butyl-4-hydroxyphenyl)propionate], 2,6-di-tert-butyl-4-dimethylaminomethylphenol, 6-sec-butyl-2,4-dinitrophenol, octadecyl 3-(3',5'-di-tert-butyl-4'-hydroxyphenyl)propionate, hexadecyl 3-(3',5'-di-tert-butyl-4'-hydroxyphenyl) propionate, octyl 3-(3',5'-di-tert-butyl-4'-hydroxyphenyl) propionate, 3-thia-1,5-pentanediol bis[(3',5'-di-tert-butyl-4'-hydroxyphenyl)propionate], 4,8-dioxa-1,11-undecanediol bis[(3',5'-di-tert-butyl-4'-hydroxyphenyl)propionate], 4,8-dioxa-1,11-undecanediol bis[(3'-tert-butyl-4'-hydroxy-5'-methylphenyl)propionate], 1,9-nonanediol bis[(3',5'-di-tert-butyl-4'-hydroxyphenyl)propionate], 1,7-heptanediaminebis [3-(3',5'-di-tert-butyl-4'-hydroxyphenyl)propionamide], 1,1-methanediaminebis[3-(3',5'-di-tert-butyl-4'-hydroxyphenyl) propionamide], 3-(3',5'-di-tert-butyl-4'-hydroxyphenyl) propionic acid hydrazide, 3-(3',5'-dimethyl-4'-hydroxyphenyl)propionic acid hydrazide, bis(3-tert-butyl-5-ethyl-2-hydroxyphen-1-yl)methane, bis(3,5-di-tert-butyl-4-hydroxyphen-1-yl)methane, bis[3-(1'-methylcyclohex-1'-yl)-5-methyl-2-hydroxyphen-1-yl]methane, bis(3-tert-butyl-2-hydroxy-5-methylphen-1-yl)methane, 1,1-bis(5-tert-butyl-4-hydroxy-2-methylphen-1-yl)ethane, bis(5-tert-butyl-4-hydroxy-2-methylphen-1-yl) sulfide, bis(3-tert-butyl-2-hydroxy-5-methylphen-1-yl) sulfide, 1,1-bis(3,4-dimethyl-2-hydroxyphen-1-yl)-2-methylpropane, 1,1-bis(5-tert-butyl-3-methyl-2-hydroxyphen-1-yl)butane, 1,3,5-tris-[1'-(3Δ,5"-di-tert-butyl-4"-hydroxyphen-1"-yl)meth-1'-yl]-2,4,6-trimethylbenzene, 1,1,4-tris(5'-tert-butyl-4'-hydroxy- 2'-methylphen-1'-yl)butane and tert-butyleatechol, p-nitrosophenol, p-nitroso-o-cresol, methoxyphenol (guajacol, pyrocatechol monomethyl ether), 2-ethoxyphenol, 2-isopropoxyphenol, 4-methoxyphenol (hydroquinone monomethyl ether), mono- or di-tert-butyl-4-methoxyphenol, 3,5-di-tert-butyl-4-hydroxyanisole, 3-hydroxy-4-methoxybenzyl alcohol, 2,5-dimethoxy-4-hydroxybenzyl alcohol (syringa alcohol), 4-hydroxy-3-methoxybenzaldehyde (vanillin), 4-hydroxy-3-ethoxybenzaldehyde (ethylvanillin), 3-hydroxy-4-methoxybenzaldehyde (isovanillin), 1-(4-hydroxy-3-methoxyphenyl)ethanone (acetovanillone), eugenol, dihydroeugenol, isoeugenol, tocopherols, such as α-, β-, γ-, δ- and ε-tocopherol, tocol, α-tocopherolhydroquinone, 2,3-dihydro-2,2-dimethyl-7-hydroxybenzofuran (2,2-dimethyl-7-hydroxycoumaran), and the like.

Suitable quinones and hydroquinones include hydroquinone, hydroquinone monomethyl ether(4-methoxyphenol), methylhydroquinone, 2,5-di-tert-butylhydroquinone, 2-methyl-p-hydroquinone, 2,3-dimethylhydroquinone, trimethylhydroquinone, 4-methylpyrocatechol, tert-butylhydroquinone, 3-methylpyrocatechol, benzoquinone, 2-methyl-p-hydroquinone, 2,3-dimethylhydroquinone, trimethylhydroquinone, tert-butylhydroquinone, 4-ethoxyphenol, 4-butoxyphenol, hydroquinone monobenzyl ether, p-phenoxyphenol, 2-methylhydroquinone, tetramethyl-p-benzoquinone, diethyl-1,4-cyclohexanedion 2,5-dicarboxylate, phenyl-p-benzoquinone, 2,5-dimethyl-3-benzyl-p-benzoquinone, 2-isopropyl-5-methyl-p-benzoquinone (thymoquinone), 2,6-diisopropyl-p-benzoquinone, 2,5-dimethyl-3-hydroxy-p-benzoquinone, 2,5-dihydroxy-p-benzoquinone, embelin, tetrahydroxy-p-benzoquinone, 2,5-dimethoxy-1,4-benzoquinone, 2-amino-5-methyl-p-benzoquinone, 2,5-bisphenylamino-1,4-benzoquinone, 5,8-dihydroxy-1,4-naphthoquinone, 2-anilino-1,4-naphthoquinone, anthraquinone, N,N-dimethylindoaniline, N,N-diphenyl-p-benzoquinonediimine, 1,4-benzoquinone dioxime, coerulignone, 3,3'-di-tert-butyl-5,5'-dimethyldiphenoquinone, p-rosolic acid (aurin), 2,6-di-tert-butyl-4-benzylidenebenzoquinone, 2,5-di-tert-amylhydroquinone, and the like.

Suitable N-oxyl compounds (i.e., nitroxyl or N-oxyl radicals) include compounds which have at least one N—O· group, such as 4-hydroxy-2,2,6,6-tetramethylpiperidin-N-oxyl, 4-oxo-2,2,6,6-tetramethylpiperidin-N-oxyl, 4-methoxy-2,2,6,6-tetramethylpiperidin-N-oxyl, 4-acetoxy-2,2,6,6-tetramethylpiperidin-N-oxyl, 2,2,6,6-tetramethylpiperidin-N-oxyl (TEMPO), 4,4',4"-tris(2,2,6,6-tetramethylpiperidin-N-oxyl)phosphite, 3-oxo-2,2,5,5-tetramethylpyrrolidin-N-oxyl, 1-oxyl-2,2,6,6-tetramethyl-4-methoxypiperidine, 1-oxyl-2,2,6,6-tetramethyl-4-trimethylsilyloxypiperidine, 1-oxyl-2,2,6,6-tetramethylpiperidin-4-yl 2-ethylhexanoate, 1-oxyl-2,2,6,6-tetramethylpiperidin-4-yl sebacate, 1-oxyl-2,2,6,6-tetramethylpiperidin-4-yl stearate, 1-oxyl-2,2,6,6-tetramethylpiperidin-4-yl-benzoate, 1-oxyl-2,2,6,6-tetramethylpiperidin-4-yl (4-tert-butyl)benzoate, bis (1-oxyl-2,2,6,6-tetramethylpiperidin-4-yl) succinate, bis(1-oxyl-2,2,6,6-tetramethylpiperidin-4-yl) adipate, bis(1-oxyl-2,2,6,6-tetramethylpiperidin-4-yl)1,10-decanedioate, bis(1-oxyl-2,2,6,6-tetramethylpiperidin4-yl)n-butylmalonate, bis (1-oxyl-2,2,6,6-tetramethylpiperidin-4-yl)phthalate, bis(1-oxyl-2,2,6,6-tetramethylpiperidin-4-yl)isophthalate, bis(1-oxyl-2,2,6,6-tetramethylpiperidin4-yl) terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris[N-butyl-N-(1-oxyl-2,2,6,6-tetramethylpiperidin-4-yl]triazine, N,N'-bis(1-oxyl-2,2,6,6-tetramethylpiperidin-4-yl)-N,N'-bisformyl-1,6-diaminohexane, 4,4'-ethylenebis(1-oxyl-2,2,6,6-tetramethylpiperazin-3-one), and the like.

Other compounds suitable for use in or as the polymerization inhibitor include phenothiazine (PTZ) and compounds with similar structures, such as phenoxazine, promazine, N,N'-dimethylphenazine, carbazole, N-ethylcarbazole, N-benzylphenothiazine, N-(1-phenylethyl)phenothiazine, N-alkylated phenothiazine derivatives such as N-benzylphenothiazine and N-(1-phenylethyl)phenothiazine, and the like. Of course, the polymerization inhibitor may include any number of particular compounds, which may each be independently selected and the same as or different from any other compound of the polymerization inhibitor.

In particular embodiments, the reaction inhibitor (D) comprises, alternatively is, a polymerization inhibitor selected from (2,2,6,6-tetramethylpiperidin-1-yl)oxyl (TEMPO), 4-hydroxy (2,2,6,6-tetramethylpiperidin-1-yl) oxyl (4HT), bis(2,2,6,6-tetramethylpiperidin-1-yl)oxyl sebacate (Bis-TEMPO), a polymer-bound TEMPO, and combinations thereof.

When utilized, the reaction inhibitor (D) may be added to the reaction as a discrete component, or may be combined with another component (e.g. the organosilanol compound (A)) prior to the reaction of components (A) and (B). The reaction inhibitor (D) may be utilized in any amount, which will be selected by one of skill in the art, e.g. dependent upon the particular reaction inhibitor (D) selected, the reaction parameters employed, the scale of the reaction (e.g. total amounts of components (A) and/or (B)), the atmosphere of the reaction, the temperature and/or pressure of the reaction, etc.). In certain embodiments, the reaction inhibitor (D) is present in the reaction in an amount of from 50 to 2000 ppm, such as in an amount of 50, alternatively of 100, alternatively of 250, alternatively of 500, alternatively of 1000, alternatively of 1500, alternatively of 2000, ppm. However, one of skill in the art will readily appreciate that amounts outside of these ranges and exemplary amounts may also be utilized, e.g. where the reaction scale and/or conditions requires additional amounts of the reaction inhibitor (D).

The reaction inhibitor (D) may be utilized in the method at any time, include before, during, and after the reaction of components (A) and (B). Additionally, the reaction inhibitor (D) may be utilized peripherally during the method, e.g. in vacuum traps, distillation and/or receiving pots, etc., in addition to use within the reaction itself. Moreover, in addition or as an alternative to the above amounts, oxygen may be added to the reaction as a separate component (e.g. in place of, or in addition to, a discrete reaction inhibitor (D) selected from the compounds above). In such instances, the oxygen may be introduced into the reaction in the form of oxygen gas, optionally in the presence of other gasses (e.g. in the form of air). When utilized, the amount of oxygen gas is selected such that the gas phase above the reaction mixture remains below the explosion limit.

The components utilized in the method (i.e., the organosilanol compound (A), the hydridosilane compound (B), the acetate salt (C), and/or the reaction inhibitor (D) (when utilized)) may be obtained or provided "as is", i.e., ready for the reaction to prepare the multifunctional organosilicon compound. Alternatively, any one or more, or all, of components (A), (B), (C), and or (D) may be formed prior to or during the reaction. In some embodiments, as introduced above, the method comprises preparing the organosilanol compound (A). In these of other embodiments, the method further comprises preparing the hydridosilane compound (B). In these or other embodiments, the method further comprises preparing the acetate salt (C).

As introduced above, the method typically includes reacting component (B) indirectly with the organosilanol compound (A) via the acetoxyhydridosilane intermediate, which may be pre-formed (e.g. in a reactive premixture) and/or formed in situ from the hydridosilane compound (B) and the acetate salt (C). In this fashion, the particular conditions utilized, while variable, are generally selected to facilitate the condensation of components (B) and (C) to prepare the acetoxyhydridosilane intermediate, as well as the condensation of component (A) and the acetoxyhydridosilane intermediate to prepare the multifunctional organosilicon compound. Moreover, the reaction is typically carried out under conditions to minimize hydrolysis of the organosilanol compound (A) and/or the hydridosilane compound (B), which may otherwise lead to undesirable side reactions. In particular, the reaction is typically carried out under anhydrous, or substantially anhydrous conditions, without the use of a stoichiometric amounts of an acid or base to facilitate either condensation reaction. For example, the use of the acetate salt (C) provides the capability to forego the use of amine bases used in other silanol-chlorosilane type condensations, which are required to scrub the HCl generated during the reaction to minimize degradation and/or undesired reactions among the reaction components. Such other conditions have been observed to result in incomplete conversion of organosilanol compounds to a desired condensation product, e.g. due to incomplete reaction, self-condensation of the organosilanol compound, etc. The particular components and conditions of the method described herein may be utilized to overcome such limitations and allow for higher conversion rates of the organosilanol compound (A) to the multifunctional organosilicon compound and/or overall yield of the multifunctional organosilicon compound, as compared to the use of another method of preparing the multifunctional organosilicon compound from components (A) and (B). For example, in certain embodiments, the method provides an overall conversion rate of the organosilanol compound (A) of at least 90%, alternatively at least 95%, alternatively at least 96%, alternatively at least 98%. In these or other embodiments, the method provides an overall yield of the multifunctional organosilicon compound of at least 90%, alternatively at least 95%, alternatively at least 96%, alternatively at least 98%.

Typically, components (A), (B), (C), and optionally (D), are reacted in a vessel or reactor to prepare the multifunctional organosilicon compound. When the reaction is carried out at an elevated or reduced temperature as described below, the vessel or reactor may be heated or cooled in any suitable manner, e.g. via a jacket, mantle, exchanger, bath, coils, etc. Likewise, the vessel or reactor may be equipped with gas inlets, condensers, bubblers, circulators, stirring devices, and/or other such equipment that may be utilized to control one or more conditions of the reactions utilized in performing the method, as will be readily appreciated in view of the description and examples herein.

Components (A), (B), (C), and optionally (D), may be fed together or separately to the vessel, or may be disposed in the vessel in any order of addition, and in any combination. In general, reference to the "reaction mixture" herein refers generally to a mixture comprising components (A), (B), (C), and optionally (D) if utilized, e.g. as obtained by combining such components together.

In certain embodiments, the method comprises adding components (A), (C), and optionally (D) to a vessel containing component (B) to prepare the reaction mixture. In other embodiments, the method comprises adding components (B) and (C) (e.g. simultaneously or sequentially) to a vessel containing component (A), and optionally (D), to prepare the reaction mixture. In both such embodiments, the reaction mixture facilitates the in situ formation of the acetoxyhydridosilane intermediate while in the presence of component (A). In other embodiments, the method comprises combining components (B) and (C) to form a reactive premixture, and subsequently combining component (A) with the reactive premixture to prepare the multifunctional organosilicon compound. In such embodiments, the reactive premixture may comprise the acetoxyhydridosilane intermediate, e.g. as formed in situ from the hydridosilane compound (B) and the acetate salt (C). In these embodiments, component (A) may be added slowly and/or portionwise to the reactive premixture, e.g. to increase the conversation rate of the reaction, minimize undesired side reaction, stabilize the reaction conditions by controlling for exotherms, etc.

The method may further comprise agitating the reaction mixture. The agitating may enhance mixing and contacting together of the reaction components when combined, e.g. in the reaction mixture. Such contacting independently may use other conditions, with (e.g. concurrently or sequentially) or without (i.e., independent from, alternatively in place of) the agitating. The other conditions may be tailored to enhance the contacting of particular components of the reaction (e.g. components (B) and (C), component (A) and the acetoxyhydridosilane intermediate, etc.), and thus reaction, of components (A) and (B) to prepare the multifunctional organosilicon compound. Other conditions may be result-effective conditions for enhancing reaction yield or minimizing amount of a particular reaction by-product included within the reaction product along with the multifunctional organosilicon compound.

Regardless of order, the components may be reacted in the presence of a carrier vehicle (e.g. a solvent, diluent, fluid, or combinations thereof), such that the reaction is carried out in a solution, emulsion, suspension, slurry, biphasic mixture, or combinations thereof. The particular solvents, carriers, and/or diluents utilized, and the respective amounts thereof employed, will be independently selected by one of skill in the art, e.g. based the particular organosilanol compound (A), hydridosilane compound (B), acetate salt (C), and/or reaction inhibitor (D) (when utilized), the particular multifunctional organosilicon compound to be prepared, etc.

In general, the reaction may be carried out under heterogeneous conditions (e.g. with one or more components suspended, but not dissolved, in the carrier vehicle) or heterogeneous conditions (e.g. in a solution state). For example, in some embodiments, the acetate salt (C) is not soluble in the carrier vehicle, such that the reaction is carried out heterogeneously). In general, any one or more of the components, or combinations thereof (e.g. the reactive premixture) may be employed in the form of a homogeneous mixture/solution (i.e., where the component(s) is/are dissolved and/or disposed in a carrier vehicle prior to forming the reaction mixture therewith). For example, portions of carrier vehicle or solvent may be added to or otherwise combined with the organosilanol compound (A), the hydridosilane compound (B), the acetate salt (C), and/or any other components of the reaction to prepare the multifunctional organosilicon compound, discretely, collectively with mixtures of one or more components, or with the reaction mixture as a whole.

The carrier vehicle is not particularly limited, and typically comprises, alternatively is, a solvent, an oil (e.g. an organic oil and/or a silicone oil), a fluid, etc., or a combination thereof, such as any one or more of those described above.

In some embodiments, the carrier vehicle comprises, alternatively is, an organic solvent. Examples of the organic solvent include those comprising an aromatic hydrocarbon, such as benzene, toluene, xylenes, etc.; an aliphatic hydrocarbon, such as heptane, hexane, octane, etc.; a halogenated hydrocarbon, such as dichloromethane, 1,1,1-trichloroethane, methylene chloride, chloroform, etc.; a processed hydrocarbon mixture such as white spirits, mineral spirits, naphtha, hydrogenated isoparaffinic hydrocarbons, etc.; dimethyl sulfoxide; dimethyl formamide; acetonitrile; tetrahydrofuran; n-methylpyrrolidone; and the like, as well as derivatives, modifications, and combination thereof. As will be appreciated from the preceding examples, the organic solvent is typically aprotic, and may be aromatic or nonaromatic, polar or nonpolar, etc. In certain embodiments, the organic solvent is a nonpolar aprotic solvent. In some such embodiments, the organic solvent is aromatic.

In certain embodiments, the carrier vehicle comprises, alternatively is, an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.) $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogenated polydecene.

In specific examples, the carrier vehicle comprises, alternatively is toluene, xylene, heptane, a hydrogenated isoparaffinic hydrocarbon (e.g. an Isopar), or any combination thereof. In some such embodiments, the carrier vehicle is free from, alternatively substantially free from, water, such that the reaction is carried out substantially anhydrously.

The temperature of the reaction will be selected and controlled depending on the particular reaction components selected, the particular multifunctional organosilicon compound being prepared, etc., such as with regard to the volatility and/or reactivity of any such constituent of the reaction. In general, the reaction may be carried out a temperature of from −78 to 100° C. However, specific ranges (e.g. from −10 to 10, from 20 to 25, from 20 to 60, etc. may be selected based on the particular components (A), (B), and (C) being reacted.

In certain embodiments, the reaction is carried out at a reduced temperature. The reduced temperature is typically less than 25° C. (ambient temperature), such as from −78° C. to less than ambient temperature, alternatively from −30 to less than ambient temperature, alternatively from −15 to less than ambient temperature, alternatively from −10 to less than ambient temperature, alternatively from −10 to 20, alternatively from −5 to 20, alternatively from −5 to 15, alternatively from 0 to 15° C. In some embodiments, the reaction is carried out at a temperature of about 0° C. (e.g. by use of an ice bath, or a circulator or chiller using ice and/or a set point of 0° C.). In alternative embodiments, the reaction is carried out at room temperature (i.e., from 20 to 25° C.).

It is to be appreciated that the reaction temperature may also differ from the ranges set forth above. For example, in certain embodiments, the reaction is carried out at an elevated temperature, such as from greater than 25 to 100° C. In some such embodiments, the elevated temperature is from greater than 25 to 90, alternatively of from 30 to 90, alternatively of from 30 to 80, alternatively of from 30 to 60° C. Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.). As but one example, in certain embodiments, the method comprises preparing the reactive premixture at a first temperature, and reacting component (A) and the reactive premixture (e.g. via combining together the same as described above) at a second temperature. In such embodiments, the first temperature may be lower or higher than the second temperature, e.g. such as when controlling for an exotherm.

The time during which the reaction of the components (to prepare the multifunctional organosilicon compound is carried out is a function of scale, reaction parameters and conditions, selection of particular components, etc. In certain embodiments, the time during which the reaction is carried out is from greater than 0 to 48 hours, such as from 1 minute to 48 hours. On a relatively large scale (e.g. greater than 1, alternatively 5, alternatively 10, alternatively 50, alternatively 100 kg), the reaction may be carried out for hours, such as from 1 to 48, alternatively from 2 to 36, alternatively from 4 to 24, alternatively of 6, 12, 18, 24, 36, or 48 hours. On a relatively small scale (e.g. gram-scale, or less than 10, alternatively 5, alternatively 1 kg), the reaction may be carried out for a time of from 1 minute to 4 hours, such as from 5 minutes to 1 hour, from 30 to 35 minutes, or for a time of 10, 15, 20, 25, or 30 minutes. Alternatively, on the same relatively small scale, the reaction may be carried out for a time of from 30 minutes to 3 hours, such as from 1 to 3, alternatively 2 to 3 hours. The particular reaction time will be readily determined by one of skill in the art, such as by monitoring conversion of the organosilanol compound (A), production of the multifunctional organosilicon compound, etc. (e.g. via chromatographic and/or spectroscopic methods).

Generally, the reaction of components (A), (B), and (C) prepares a reaction product comprising the multifunctional organosilicon compound. In particular, over the course of the reaction, the reaction mixture comprising components (A), (B), and (C) comprises increasing amounts of the multifunctional organosilicon compound and decreasing amounts of components (A) and (B). Once the reaction is complete (e.g. one of components (A) or (B) is consumed, no additional multifunctional organosilicon compound is being prepared, etc.), the reaction mixture may be referred to as a reaction product comprising the multifunctional organosilicon compound. In this fashion, the reaction product typically includes any remaining amounts of components (A), (B), (C), and (D) (when present), as well as degradation and/or reaction products thereof (e.g. materials which were not previously removed via any distillation, stripping, etc.).

If the reaction is carried out in any carrier vehicle or solvent, the reaction product may also include such carrier vehicle or solvent.

In certain embodiments, the reaction product is free from, alternatively substantially free from byproduct formed from homocondensation of the organosilanol compound (A). In these or other embodiments, the reaction product comprises a residual amount of the organosilanol compound (A) of less than 10%, alternatively less than 8%, alternatively less than 5%, alternatively less than 3%, based on the total amount of the organosilanol compound (A) utilized (e.g. by weight or molar amount).

In certain embodiments, the method further comprises isolating and/or purifying the multifunctional organosilicon compound from the reaction product. As used herein, isolating the multifunctional organosilicon compound is typically defined as increasing the relative concentration of the multifunctional organosilicon compound as compared to other compounds in combination therewith (e.g. in the reaction product or a purified version thereof). As such, as is understood in the art, isolating/purifying may comprise removing the other compounds from such a combination (i.e., decreasing the amount of impurities combined with the multifunctional organosilicon compound, e.g. in the reaction product) and/or removing the multifunctional organosilicon compound itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the multifunctional organosilicon compound. It is to be appreciated that isolating may include, and thus may be referred to as, purifying the multifunctional organosilicon compound. However, purifying the multifunctional organosilicon compound may comprise alternative and/or additional techniques as compared to those utilized in isolating the multifunctional organosilicon compound. Regardless of the particular technique(s) selected, isolation and/or purification of multifunctional organosilicon compound may be performed in sequence (i.e., in line) with the reaction itself, and thus may be automated. In other instances, purification may be a stand-alone procedure to which the reaction product comprising the multifunctional organosilicon compound is subjected.

In particular embodiments, isolating the multifunctional organosilicon compound comprises washing and/or extracting the reaction mixture, e.g. via adding an aqueous solution (e.g. water, brine, etc.), and optionally a nonaqueous solvent thereto and separating the phases upon partitioning. For example, in some embodiments, the method comprises washing the reaction mixture with sequential portions of different aqueous solutions (e.g. water, aqueous sodium carbonate, brine, etc.) to remove aqueous constituents from the reaction mixture. In such embodiments, isolating the multifunctional organosilicon compound typically also comprises distilling and/or stripping volatiles from the reaction product, e.g. to remove the nonaqueous solvents or other volatiles therefrom. In both or either case (e.g. after removing aqueous constituents via washing/extracting and/or volatiles via stripping/distillation), the reaction product (i.e., now separated from other constituents of differing solubility and/or volatility) may be referred to as the isolated multifunctional organosilicon compound.

It will be appreciated that other techniques and/or procedures may also be utilized. For example, in some embodiments, isolating the multifunctional organosilicon compound comprises filtering the reaction product (e.g. to remove solids, salts, and other precipitated or suspended materials therefrom). In such embodiments, a solvent and/or diluent (e.g. an organic solvent, such as toluene, diethyl ether, etc.) may be utilized to solubilize and/or precipitate various components of the reaction product to facilitate isolating the multifunctional organosilicon compound, as understood by those of skill in the art. In these or other embodiments, isolating the multifunctional organosilicon compound may comprise distilling and/or stripping volatiles from the reaction product. For example, in certain embodiments, such as where a carrier vehicle is utilized, volatiles are distilled and/or stripped from the reaction mixture comprising the multifunctional organosilicon. In both or either case (e.g. after removing solids via filtration and/or volatiles via stripping/distillation), the reaction product (i.e., now separated from solids and/or volatiles) may be referred to as the isolated multifunctional organosilicon compound.

In particular embodiments, the method further comprises purifying the multifunctional organosilicon compound. Any suitable technique for purification may be utilized. In certain embodiments, purifying the multifunctional organosilicon compound comprises distillation, to either remove the multifunctional organosilicon compound (e.g. as a distillate) or to strip other compounds/components therefrom (i.e., leaving the multifunctional organosilicon compound in the pot as a high-boiling component of the reaction mixture or purified reaction mixture. As will be appreciated by those of skill in the art, distilling the reaction product or purified reaction product to purify and/or isolate the multifunctional organosilicon compound is typically carried out at an elevated temperature and a reduced pressure. The elevated temperature and reduced pressure are independently selected, e.g. based on the particular components of the reaction, the particular multifunctional organosilicon compound prepared, other isolation/purification techniques utilized, etc., as will be readily determined by those of skill in the art. In some embodiments, purifying the multifunctional organosilicon compound may be defined as purifying the isolated multifunctional organosilicon compound (e.g. where purification is performed subsequent to isolation of the multifunctional organosilicon compound).

As introduced above, the method prepares the multifunctional organosilicon compound. More specifically, as will be understood in view of the description of the structure of components (A) and (B) and parameters of the reaction thereof, the method prepares the multifunctional organosilicon compound as the addition product of the organosilanol compound (A) and the hydridosilane compound (B), e.g. via condensation-mediated substitution of the organosilanol compound (A) for the hydrolysable groups (Z) of the hydridosilane compound (B).

Typically, the multifunctional organosilicon compound prepared in accordance with the method has the following general formula:

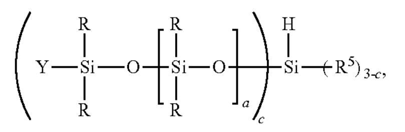

where each Y, R, $R^5$, subscript a, and subscript c are independently selected and as defined above. More specifically, each functional moiety Y is an independently selected alkoxysilyl or acryloxy moiety, each R is an independently selected hydrocarbyl group, each $R^5$ is an independently selected hydrocarbyl group, each subscript a is independently 0, 1, or 2 in each moiety indicated by subscript c, and subscript c is 2 or 3.

As will be understood by one of skill in the art in view of the description herein, the organosilanol compound (A) utilized in the method forms a portion of the multifunctional organosilicon compound corresponding to the moiety designated by subscript c in the general formula above, and the hydridosilane compound (B) utilized in the method forms a portion of the multifunctional organosilicon compound corresponding to the moiety represented by the subformula $—Si(H)(R^5)_{3-c}$, as described herein. As such, where formulas, structures, moieties, groups, or other such motifs are shared between the multifunctional organosilicon compound and the organosilanol compound (A) and/or the hydridosilane compound (B) utilized in the method, the description above with respect to such shared motifs may equally describe the multifunctional organosilicon compound (e.g. with respect to each Y, R, $R^5$, subscript a, subscript c, etc.).

For example, the multifunctional organosilicon compound comprises two or three functional moieties Y (i.e., where subscript c is 2 or 3, respectively, as described below), which are each independently selected from alkoxysilyl moieties and acryloxy moieties (i.e., each functional moiety Y comprises at least one independently selected alkoxysilyl or acryloxy substituent, as described above). As such, each functional moiety Y may be the same as or different from any other functional moiety Y in the multifunctional organosilicon compound. In certain embodiments, each functional moiety Y is the same. In other embodiments, at least one functional moiety Y is different than at least one other functional moiety Y of the multifunctional organosilicon compound. In particular embodiments, each functional moiety Y of the multifunctional organosilicon compound is different from each other Y. Regardless, as the multifunctional organosilicon compound comprises two or three functional moieties Y, reference herein to the singular "functional moiety Y" or simply "Y" with respect to the multifunctional organosilicon compound is to be understood as referring to each functional moiety Y, collectively, in the multifunctional organosilicon compound (i.e., each of the two or three functional moieties Y shown in the general formula above).

The alkoxysilyl or acryloxy substituent of the functional moiety Y may be bonded directly (e.g. via covalent bond) or indirectly (e.g. via divalent linking group) to the silicon atom shown in the general formula of the multifunctional organosilicon compound above (i.e., the siloxane backbone of the multifunctional organosilicon compound). In certain embodiments, the alkoxysilyl or acryloxy substituent of the functional moiety Y is bonded directly to the siloxane backbone of the multifunctional organosilicon compound, such that Y itself represents the alkoxysilyl or acryloxy group, as described above. For example, in some embodiments, each functional moiety Y has the formula $-D-R^1$, such that the multifunctional organosilicon compound has the following general formula:

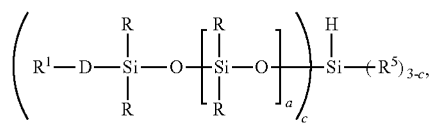

where each R, $R^1$, $R^5$, D, subscript a, and subscript c are independently selected and as defined above. More specifically, each $R^1$ comprises an independently selected alkoxysilyl group or acryloxy group, and each D is an independently selected divalent linking group.

For example, in some such embodiments, each linking group D comprises a hydrocarbon moiety having the formula $—(CH_2)_m—$, where subscript m is from 1 to 16, alternatively from 1 to 6. In these or other embodiments, each linking group D comprises a substituted hydrocarbon. For example, in some embodiments, at least one linking group D is a hydrocarbon having a backbone comprising an ether moiety. Each linking group D may be the same as or different from any other linking group D in the multifunctional organosilicon compound (e.g. each functional moiety Y may comprise the same as or different D as any other functional moiety Y). In certain embodiments, each linking group D is the same. In other embodiments, at least one linking group D is different than at least one other D of the multifunctional organosilicon compound. Regardless, as the multifunctional organosilicon compound comprises two or three functional moieties Y, which may each have the formula $R^1$-D-, reference herein to linking group D in the singular form may apply to but one linking group D or to each linking group D in the multifunctional organosilicon compound (i.e., in each of the two or three functional moieties Y).

As introduced above, each $R^1$ independently comprises an alkoxysilyl group or an acryloxy group. These groups are not particularly limited, and are exemplified by the general and specific examples herein. Each $R^1$ may be the same as or different from any other $R^1$ in the multifunctional organosilicon compound (e.g. each functional moiety Y may comprise the same as or different $R^1$ as any other functional moiety Y). In certain embodiments, each $R^1$ is the same. In other embodiments, at least one $R^1$ is different than at least one other $R^1$ of the multifunctional organosilicon compound. In specific embodiments, the multifunctional organosilicon compound comprises at least two, alternatively three, different $R^1$ substituents. Regardless, as the multifunctional organosilicon compound comprises two or three functional moieties Y, which may each have the formula $R^1$-D-, reference herein to $R^1$ in the singular form may apply to but one $R^1$ or to each $R^1$ in the multifunctional organosilicon compound (i.e., in each of the two or three functional moieties Y).

In certain embodiments, $R^1$ is an independently selected alkoxysilyl group having the following formula:

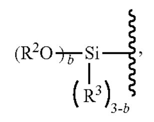

where each $R^2$, $R^3$, and subscript b are independently selected and as defined above. More specifically, subscript b is 1, 2, or 3, $R^2$ is an independently selected hydrocarbyl group in each moiety indicated by subscript b, and each $R^3$ is an independently selected hydrocarbyl group. In these embodiments, the alkoxysilyl group $R^1$ may be further defined as a mono, di, or trialkoxysilyl group, i.e., when subscript b is 1, 2, or 3, respectively. Typically, subscript b is 2 or 3, such that the alkoxysilyl group $R^1$ comprises at least two alkoxy groups represented by the subformula $R^2O—$ above, for which each $R^2$ may be the same as or different from any other $R^2$ in the alkoxysilyl group $R^1$. In certain embodiments, each $R^2$ and $R^3$ is independently selected from alkyl groups, such as methyl groups, ethyl groups, etc., such that the alkoxysilyl group $R^1$ may be defined as a trialkoxysilyl, dialkoxyalkylsilyl, or alkoxyldialkylsilyl group, i.e., where subscript b is 3, 2, or 1, respectively. For example, in specific embodiments, subscript b is 3 and each $R^2$ is methyl, such that $R^1$ is a trimethoxysilyl group (e.g. is of formula $(CH_3O)_3Si$—). Likewise, in other embodiments, subscript b is 3 and each $R^2$ is ethyl, such that $R^1$ is a triethoxysilyl group (e.g. is of formula $(CH_3CH_2O)_3Si$—). In some embodiments, subscript b is 2, each $R^2$ is methyl, and $R^2$ is methyl, such that $R^1$ is a trimethoxysilyl group (e.g. is of formula $(CH_3CH_2O)_3$ Si—).

In certain embodiments, $R^1$ is an independently selected acryloxy group having the following formula:

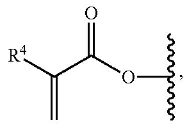

where $R^4$ is as defined above. More specifically, $R^4$ is H or an independently selected hydrocarbyl group (e.g. a substituted or unsubstituted hydrocarbyl group, such as those having from 1 to 4 carbon atoms). In certain embodiments, $R^4$ is H, such that the acryloxy group $R^1$ may be defined as an acrylate group. In other embodiments, $R^4$ is an alkyl group (e.g. methyl, ethyl, propyl, butyl, etc.), such that the acryloxy group $R^1$ may be defined as an alkylacrylate group. In specific embodiments, $R^4$ is methyl, such that the acryloxy group $R^1$ may be defined as a methacrylate group.

Subscript c of the multifunctional organosilicon compound is 2 or 3. As such, in certain embodiments, subscript c is 2 and the multifunctional organosilicon compound has the following formula:

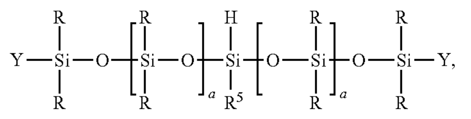

where each R, $R^5$, Y, and subscript b are independently selected and as defined herein. In other embodiments, subscript c is 3 and the multifunctional organosilicon compound has the following formula:

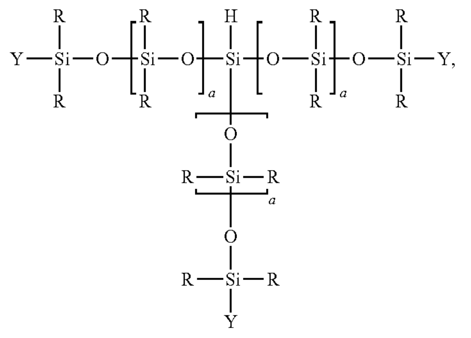

where each R, Y, and subscript a are independently selected and as defined herein.

Each subscript a of the multifunctional organosilicon compound is independently 0, 1, or 2 in each moiety designated by subscript c. As such, those of skill in the art will readily understand that each moiety designated by subscript c may independently be of subformula Y—$Si(R)_2$O— (i.e., a monosiloxane, where subscript a is 0), Y—$Si(R)_2O$—$Si(R)_2O$— (i.e., a disiloxane, where subscript a is 1), or Y—$Si(R)_2O$—$Si(R)_2O$—$Si(R)_2O$— (i.e., a trisiloxane, where subscript a is 2). In any such case, each Y and R are independently selected and as defined herein.

For example, in certain embodiments, each subscript a is 0 in each moiety designated by subscript c. In some such embodiments, subscript c is 2 and the multifunctional organosilicon compound has the following formula:

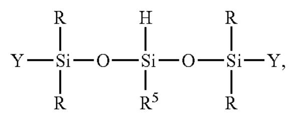

where each R, $R^5$, and Y are independently selected and as defined herein. In other such embodiments, subscript c is 3 and the multifunctional organosilicon compound has the following formula:

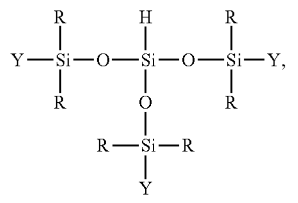

where each R and Y are independently selected and as defined herein.

In particular embodiments, each subscript a is 1 in each moiety designated by subscript c. In some such embodiments, subscript c is 2 and the multifunctional organosilicon compound has the general formula:

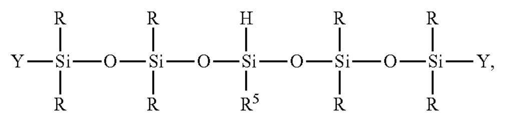

where each R, $R^5$, and Y are independently selected and as defined herein. In other such embodiments, subscript c is 3 and the multifunctional organosilicon compound has the general formula:

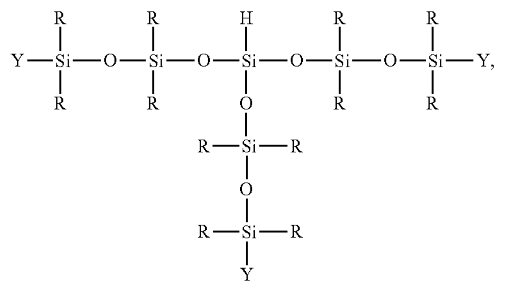

where each R and Y are independently selected and as defined herein.

In particular embodiments, each subscript a is 2 in each moiety designated by subscript c. In some such embodiments, subscript c is 2 and the multifunctional organosilicon compound has the general formula:

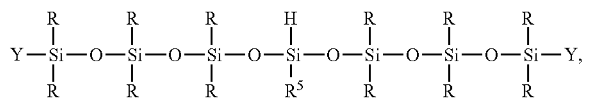

where each R and Y are independently selected and as defined herein. In other such embodiments, subscript c is 3 and the multifunctional organosilicon compound has the general formula:

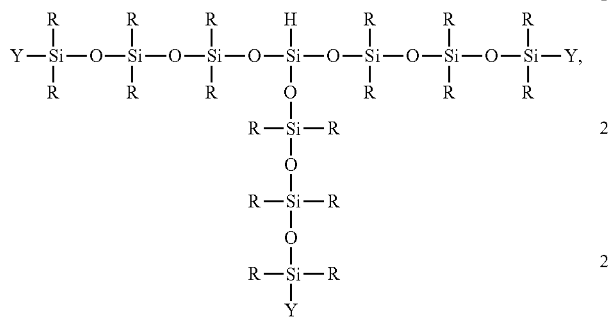

where each and Y are independently selected and as defined herein.

As described above, each subscript a of the multifunctional organosilicon compound need not be the same, but instead may be different from another subscript a. As but one example, where subscript c is 2 and the multifunctional organosilicon compound comprises one moiety designated by subscript c where subscript a is 0, and one moiety designated by subscript c where subscript a is 1, such that the multifunctional organosilicon compound has the following formula:

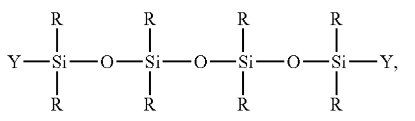

where each R, $R^5$, and Y are independently selected and as defined herein.

The multifunctional organosilicon compound prepared according to the method may be utilized in diverse end use applications, e.g. as a discrete component in a composition (e.g. a curable composition), as a component of a reaction to prepare a functionalized compound, etc. For example, because the multifunctional organosilicon compound includes at least one silicon-bonded hydrogen atom per molecule (i.e., from the hydridosilane compound (B)), the multifunctional organosilicon compound may be utilized in a hydrosilylation reaction. As such, the multifunctional organosilicon compound may be utilized to prepare a functionalized siloxane compound, e.g. via reaction with a polysiloxane including at least one silicon-bonded ethylenically unsaturated group, in the presence of a hydrosilylation catalyst.

Likewise, as the multifunctional organosilicon compound also comprises alkoxysilyl and/or acryloxy-functional moieties, the multifunctional organosilicon compound, as well as the functionalized siloxane compound prepared therewith, may be utilized as a component in a curable composition. For example, where the multifunctional organosilicon compound is prepared from the acryloxy-functional organosilanol compound (A), the multifunctional organosilicon compound, as well as a functionalized siloxane compound prepared therewith, may be utilized as a component in a hydrosilylation-curable composition. Similarly, where the multifunctional organosilicon compound is prepared from the alkoxysilyl-functional organosilanol compound (A), the multifunctional organosilicon compound, as well as a functionalized siloxane compound prepared therewith, may be utilized as a component in a condensation-curable composition.

When combined with one or more additives, the condensation and/or hydrosilylation-curable compositions comprising the multifunctional organosilicon compound and/or the functionalized siloxane compound, may be utilized in, or as, an adhesive composition. Examples of suitable additives for preparing such adhesive compositions include fillers, treating agents (e.g. filler treating agents), cross-linkers, adhesion promotors, surface modifiers, drying agents, extenders, biocides, flame retardants, plasticizers, end-blockers, binders, anti-aging additives, water release agents, pigments, rheology modifiers, carriers, tackifying agents, corrosion inhibitors, catalyst inhibitors, viscosity modifiers, UV absorbers, anti-oxidants, light-stabilizers, and the like, as well as combinations thereof.

The following examples are intended to illustrate the invention and are not to be viewed in any way as limiting to the scope of the invention. The brief summary immediately below provides information as to certain abbreviations, shorthand notations, and components utilized in the Examples. All reaction products are characterized by NMR ($^1H$, $^3C$, and $^{29}Si$) and GC-FID.

Organosilanol Compounds (A)

"AMA-Silanol" is an organosilanol compound having the following formula:

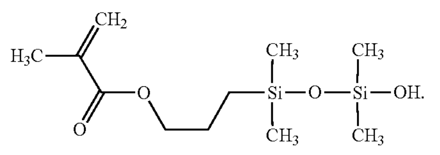 [SMILES: C=C(C)C(=O)OCCC[Si](C)(C)O[Si](C)(C)O]

"ETM-Silanol" is an organosilanol compound having the following formula:

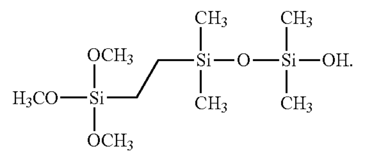 [SMILES: CO[Si](CC[Si](C)(C)O[Si](C)(C)O)(OC)OC]

Multifunctional Organosilicon Compounds

"Difunctional-AMA Si—H Converter" is a multifunctional organosilicon compound having the following formula:

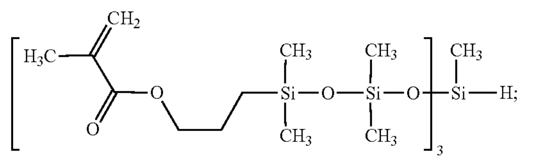

and is prepared in Example 1 and Comparative Example 1 below.

"Trifunctional-AMA Si—H Converter" is a multifunctional organosilicon compound having the following formula:

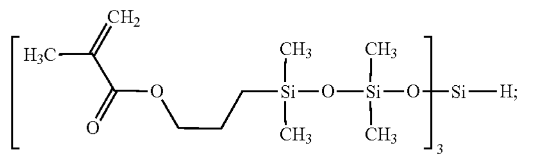

and is prepared in Example 2 below.

"Difunctional-ETM Si—H Converter" is a multifunctional organosilicon compound having the following formula:

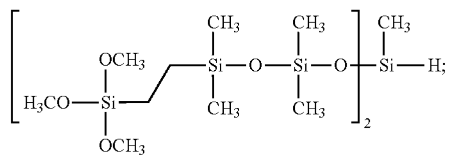

and is prepared in Example 3 below.

Example 1

Preparation of Difunctional-AMA Si—H Converter

A dried jacketed reactor (300 mL) equipped with a mechanical stirrer is charged with sodium acetate (anhydrous; 202 mmol; 1.2 eq.) and toluene (anhydrous; 54 mL) to give a heterogeneous mixture, which is cooled to and held at 15 QC under a nitrogen atmosphere with stirring (250 rpm). Dichloromethylsilane (101 mmol; 0.6 eq.) is gradually added to the mixture in the reactor over 5 min to provide a 20° C. exotherm and give a reactive premixture, which is stirred for 30 min. AMA-Silanol (167 mmol; 1 eq.; 3.0 M in toluene) is then gradually added to the reactive premixture over 30 min (rate: 1.5 mL/min), during which time the reaction temperature is maintained at 20° C. The resulting reaction mixture is agitated for 30 min at 15° C., charged with water (33 mL), and then stirred for 10 min. The resulting mixture is washed with water (33 mL), aqueous sodium carbonate (3 M; 33 mL) and brine (33 mL), and the organics concentrated (vacuum distillation) to give the product as a clear viscous liquid (Difunctional-AMA Si—H Converter; 49.2 g; 99% yield; 2% remaining silanol (GCMS)).

Example 2

Preparation of Trifunctional-AMA Si—H Converter

A dried jacketed reactor (300 mL) equipped with a mechanical stirrer is charged with sodium acetate (anhydrous; 193 mmol; 1.1 eq.) and toluene (anhydrous; 58 mL) to give a heterogeneous mixture, which is cooled to and held at 15° C. under a nitrogen atmosphere with stirring (250 rpm). Trichloromethylsilane (61.4 mmol; 0.35 eq.) is gradually added to the mixture in the reactor over 15 min to provide an 8° C. exotherm and give a reactive premixture, which is stirred for 90 min. AMA-Silanol (174 mmol; 1 eq.; 3.0 M in toluene) is then gradually added to the reactive premixture over 30 min (rate: 1.5 mL/min), during which time the reaction temperature is maintained at ≤22° C. The resulting reaction mixture is agitated for 150 min at 15° C., and then charged with water (33 mL) and stirred for 10 min. The resulting mixture is washed with water (33 mL), aqueous sodium carbonate (3 M; 33 mL) and brine (33 mL), and the organics concentrated (vacuum distillation) to give the product as a clear viscous liquid (Trifunctional-AMA Si—H Converter; 47.5 g; 96% yield).

Example 3

Preparation of Difunctional-ETM Si—H Converter

A dried reactor equipped with a stirrer and nitrogen sweep is charged with sodium acetate (anhydrous, oven dried; 2.6 g; 31.6 mmol; 1.26 eq.) and toluene (anhydrous; 50 mL) under a nitrogen atmosphere to give a heterogeneous mixture, which is cooled to and held at 0° C. with an ice bath. Dichloromethylsilane (1.2 mL; 11.5 mmol; 0.46 eq.) is then added to the mixture in the reactor to give a reactive premixture. ETM-Silanol (7.5 g; 25 mmol; 1 eq.) is then added dropwise to the reactive premixture over 15 min with stirring to give a reaction mixture, which is stirred for 30 min and then filtered, washed with water (50 mL), NaOH (1 M; 50 mL), and brine (50 mL) The organics are then dried with $MgSO_4$, filtered, concentrated (rotary evaporator), and dried under high vacuum to give the product (Difunctional-ETM Si—H Converter; 4.72 g; 64% yield).

Comparative Example 1

Preparation of Difunctional-AMA Si—H Converter

A 2-neck flask (100 mL) equipped with a nitrogen outlet, thermocouple, addition funnel, and stir bar is charged with dichloromethylsilane (5 mmol; 0.5 eq.) and diethyl ether (20 mL) to give a solution, which is cooled to and held at 0° C. with an ice bath. The addition funnel is charged with AMA-Silanol (2.76 g; 10 mmol; 1 eq.), pyridine (0.8 mL; 10 mmol; 1 eq.), and diethyl ether (5 mL), and the resulting mixture added dropwise to the stirring solution in the flask to give a reaction mixture, which immediately forms a white precipitate and provides a 6° C. exotherm. The ice bath is removed, and the reaction mixture stirred while warming to room temperature. The reaction mixture is then filtered (plastic fritted funnel) to remove the precipitate, and the filtrate transferred to a separation funnel. The organics are then washed with aqueous HCl (1M; 10 mL), sat. $NaHCO_3$ (10 mL), and brine (10 mL), dried with MgSO4, filtered, and concentrated (rotary evaporator) to give a clear liquid, which is then dried under high vacuum to give the product (Difunctional-AMA Si—H Converter; 2.4 g; 80% yield; 8% remaining silanol (GCMS)).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The invention claimed is:

1. A method of preparing a multifunctional organosilicon compound, said method comprising:

reacting (A) an organosilanol compound comprising a functional moiety selected from alkoxysilyl moieties and acryloxy moieties and (B) a hydridosilane compound having at least two hydrolysable groups in the presence of (C) an acetate salt comprising a complex having the general formula $[R^6C(O)O]^-[M]^+$, where $R^6$ is a substituted or unsubstituted methyl group and M is an alkali metal, thereby preparing the multifunctional organosilicon compound, wherein, the organosilanol compound (A) has the following general formula:

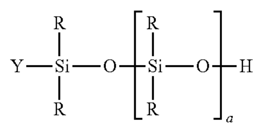

where Y is the functional moiety selected from alkoxysilyl moieties and acryloxy moieties, each R is an independently selected hydrocarbyl group, and subscript a is 0, 1, or 2.

2. The method of claim 1, wherein in the organosilanol compound (A): (i) each R is methyl; (ii) subscript a is 0 or 1; or (iii) both (i) and (ii).

3. The method of claim 1, wherein the hydridosilane compound (B) has the following general formula:

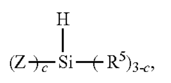

where each Z is a hydrolysable group independently selected from halogens, alkoxy groups, carboxy groups, oxime groups, and aminoxy groups, each $R^5$ is an independently selected hydrocarbyl group, and subscript c is 2 or 3.

4. The method of claim 3, wherein: (i) each hydrolysable group Z is Cl; (ii) subscript c is 2 and $R^5$ is methyl; or (iii) both (i) and (ii).

5. The method of claim 1, wherein the acetate salt (C) comprises sodium acetate.

6. The method of claim 1, wherein reacting the organosilanol compound (A) and the hydridosilane compound (B) in the presence of the acetate salt (C) comprises combining together the hydridosilane compound (B) and the acetate salt (C) to form a reactive premixture, and subsequently combining together the reactive premixture and the organosilanol compound (A), thereby preparing the multifunctional organosilicon compound.

7. The method of claim 1, further comprising reacting the organosilanol compound (A) and the hydridosilane compound (B): (i) in the presence of a carrier vehicle; (ii) at a temperature of less than 25° C.; (iii) substantially anhydrously; or (iv) any combination of (i) to (iii).

8. The method of claim 7, wherein the organosilanol compound (A) and the hydridosilane compound (B) are reacted in the presence of the carrier vehicle, and wherein the carrier vehicle comprises an organic solvent that is: (i) aprotic; (ii) aromatic; (iii) nonpolar; or (iv) any combination of (i) to (iii).

9. The method of claim 8, wherein the carrier vehicle comprises: (i) toluene; (ii) xylene; (iii) heptane; (iv) a hydrogenated isoparaffinic hydrocarbon; or (v) any combination of (i) to (iv).

10. The method of claim 1, wherein reacting the organosilanol compound (A) and the hydridosilane compound (B) in the presence of the acetate salt (C) gives a reaction product comprising the multifunctional organosilicon compound, and wherein: (i) the reaction product is substantially free from byproduct formed from homocondensation of the organosilanol compound (A); (ii) the reaction product comprises a residual amount of the organosilanol compound (A) of less than 5%, based on the total amount of the organosilanol compound (A) utilized; (iii) the method further comprises isolating the multifunctional organosilicon compound from the reaction product; or (iv) any combination of (i) to (iii).

11. The method of claim 1, further comprising reacting the organosilanol compound (A) and the hydridosilane compound (B) in a stoichiometric ratio of ≤1:1 (A):(B), wherein the reaction comprises: (i) an overall conversion of the organosilanol compound (A) of at least 95%; (ii) a yield of the multifunctional organosilicon compound of at least 95% based on the organosilanol compound (A); or (iii) both (i) and (ii).

* * * * *